United States Patent [19]

Etzler

[11] 4,175,900
[45] Nov. 27, 1979

[54] PLUG-IN BALE MOVER

[76] Inventor: John L. Etzler, Rte. 2, Box 239, Troutville, Va. 24175

[21] Appl. No.: 825,168

[22] Filed: Aug. 16, 1977

[51] Int. Cl.$^2$ .............................................. E02F 3/81
[52] U.S. Cl. ................................... 414/787; 37/117.5; 414/703; 414/724
[58] Field of Search ............ 214/1 HH, 1 HA, 130 C, 214/131 R, 144, 145 R, 145 A, 766; 37/117.5, DIG. 3, DIG. 12; 414/24.5, 24.6, 684, 685, 703, 721, 722, 724

[56] References Cited

U.S. PATENT DOCUMENTS

| | | | |
|---|---|---|---|
| 2,471,152 | 5/1949 | Griffin | 214/144 |
| 2,760,660 | 8/1956 | Garner et al. | 214/144 X |
| 2,791,340 | 5/1957 | Haines et al. | 214/766 X |
| 3,034,237 | 5/1962 | Wolfe et al. | 214/145 R X |
| 3,658,384 | 4/1972 | Gluszek | 37/117.5 X |
| 3,667,633 | 6/1972 | VCappella | 214/145 R |
| 3,921,837 | 11/1975 | Vandewater | 214/145 R |
| 4,025,006 | 5/1977 | Turnbow | 214/766 X |
| 4,056,205 | 11/1977 | Etzler | 214/145 R |

Primary Examiner—L. J. Paperner
Attorney, Agent, or Firm—Eric P. Schellin

[57] ABSTRACT

A bale mover comprises a set of tines which plugs into a hitch. The hitch is supported by a bracket assembly including telescoping tubes which are disposed in the interior of a bucket. The hitch comprises sockets which receive the stub ends of the tines of the mover, and the hitch is fastened to the top of a bucket by means of mounting straps. A safety bar located above the plane of the tines prevents a bale which is being carried by the tines from rolling backward onto an operator. Also disclosed is a rear mounted bale mover. The mover attaches to the rear lift arms of a tractor by means of a generally L-shaped mounting frame. Embodiments of bale movers including two tines or three tines are disclosed. Also disclosed is an embodiment wherein the tines are provided with elongated mounting stubs. These stubs enable the bale mover to be mounted on a bucket where the side walls of the bucket are cut back. The elongated mounting stubs limit the penetration of a bale by the tines to a point on the tines such that a perpendicular from the tines at this point coincides with the bottom front edge of the bucket.

7 Claims, 9 Drawing Figures

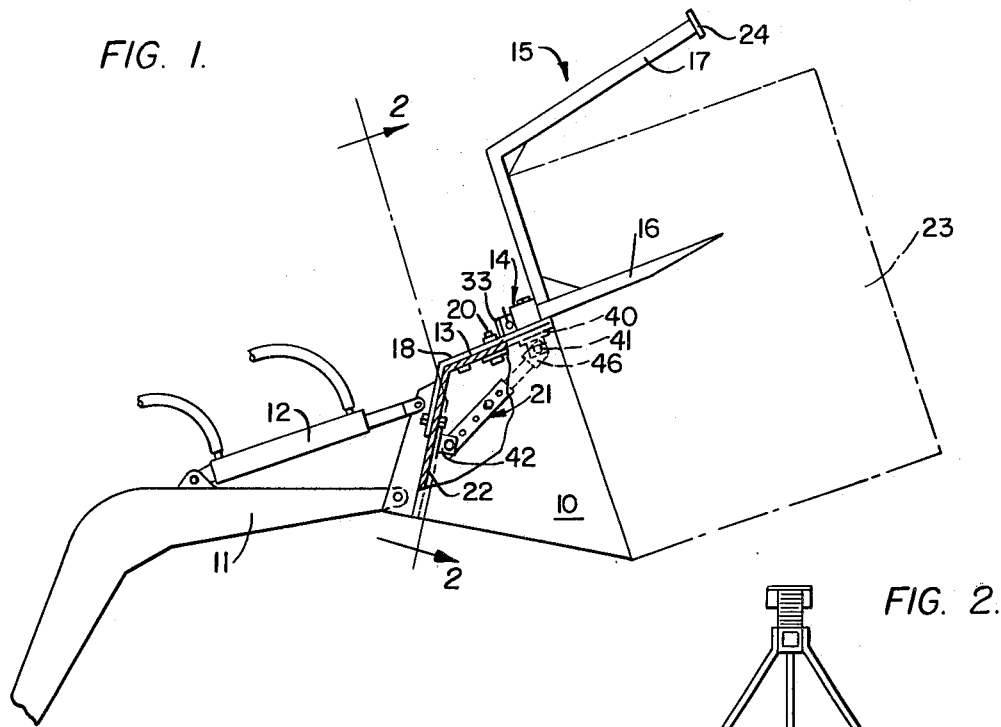
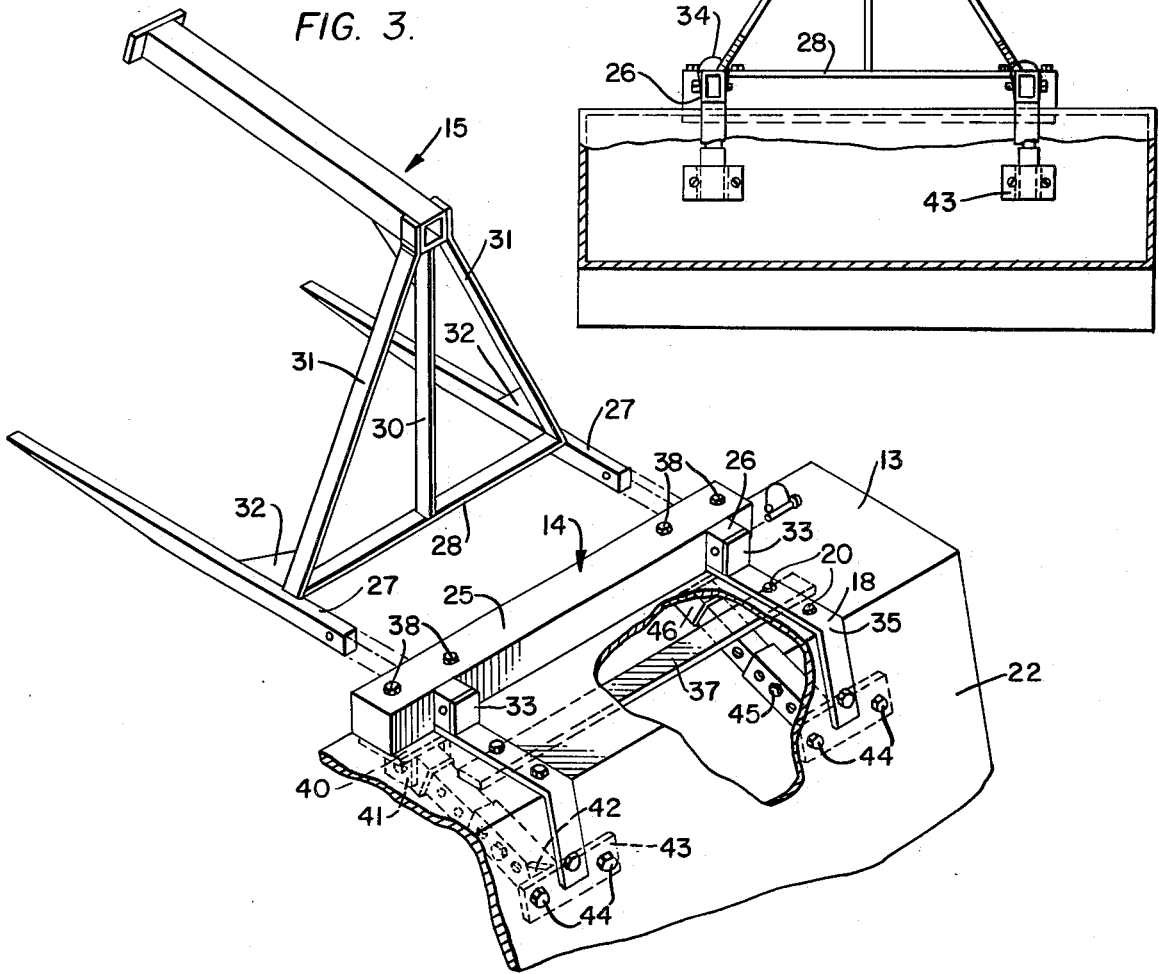

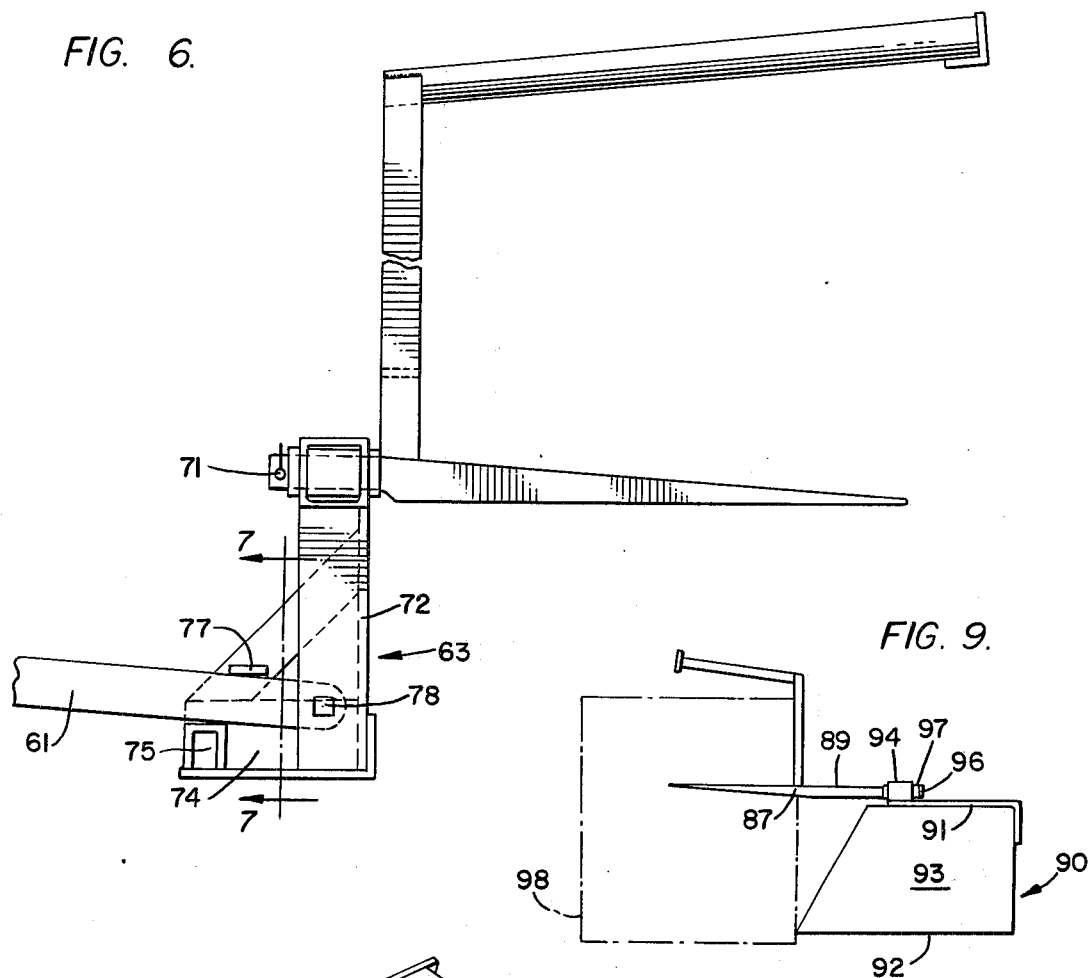
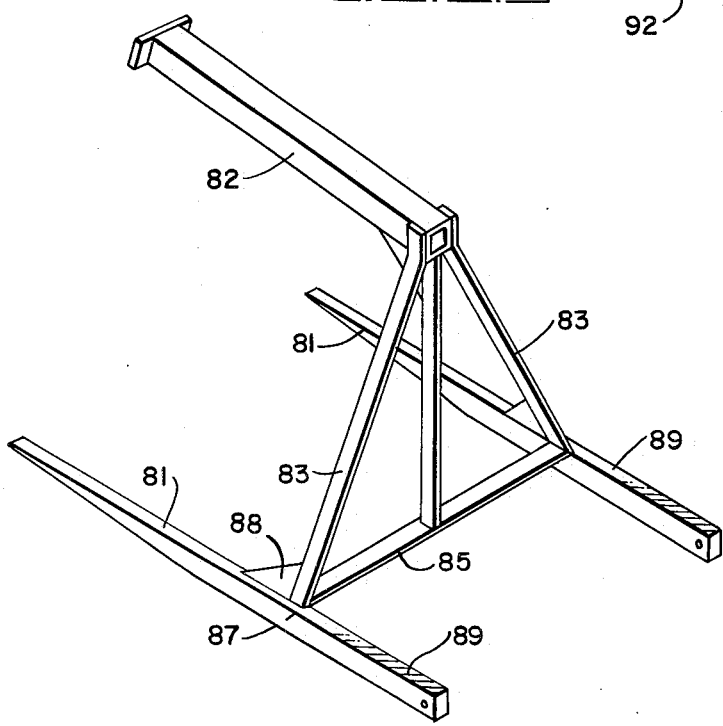

PLUG-IN BALE MOVER

BACKGROUND OF THE INVENTION

The invention relates to a plug-in bale mover which mounts on the front loader of a farm tractor or in the alternative on the rear lift arms of such a tractor. With the wide variety of loader bucket designs and sizes, it is necessary to provide the bale mover which will readily fit the various sizes of loader buckets. The bale mover which requires a hitch bracket which has been made for a specific width bucket is undesirable since it is not universal. Farm equipment dealers are reluctant to stock specific models of bale loaders, but will stock a single loader which is adapted to fit a wide range of buckets. With the increasing popularity of large cylindrical hay bales, a great many tine-type bale movers have been developed and are known in the prior art. All of these movers require some specific hitch assembly which attaches to the loader bucket of a front loader. In most instance, the hitch is made for a specific shape and size bucket. Until the present time, a hitch which was universally adaptable to all sizes and shapes of loader buckets has not been known. It is essential that the mounting of a hitch onto a loader bucket be such that the stresses which develop during use of the hitch with bale moving tines can be withstood by the bucket and the mounting assembly. A disadvantage of the prior art tine-type bale movers is the fact that a cylindrical bale is supported and maintained in position on the tool solely by the tines themselves. While the bale is being moved from one place to another using the tines, the bucket of the farm tractor is in a raised and inclined position which is above the operator. In the event that the bale should become free from the tines, there is a distinct chance that the bale will roll backward onto the lift arms of the tractor and subsequently onto the operator. No bale mover known in the prior art includes structure to preclude such an occurrence.

The present invention is directed to a plug-in bale mover which is adapted to be mounted on the bucket of a front loader or on the rear lift arms of such a loader. The bale mover includes a hitch which may be permanently attached by bolts to the top wall of the bucket. The hitch includes sockets which receive the mounting stubs of an assembly of tines. The penetration of the stubs into the sockets of the hitch is limited by plates located on the rear of the sockets. The tine assembly includes two or in the alternative three tines which are ganged together in a planar array. Above this planar array is a safety bar. The safety bar is provided with a blunt end so that the bar is prevented from impaling a cylindrical bale which is being moved by the tines. The safety bar acts as a stop to prevent the backward rolling of a cylindrical hay bale should it become free from the tines while the bale is being transported. Also disclosed is a hitch and tine assembly which mounts on the rear of a farm tractor. An L-shaped mounting frame is easily attached to the lift arms on the tractor, and the frame includes the hitch which receives a removable array of tines. A safety bar is included with the tine assembly to prevent the bale which is being transported from coming free of the tines and rolling onto an operator.

BRIEF DESCRIPTION OF THE DRAWINGS

FIG. 1 is a perspective view of a hitch and tine assembly with the safety bar mounted on the top surface of the bucket of a front loader.

FIG. 2 is a sectional view taken along line 2—2 of FIG. 1.

FIG. 3 is a perspective view showing in greater detail the hitch and tine assembly of FIG. 1.

FIG. 6 is a side view of the rear mounted bale mover of FIG. 5.

FIG. 8 is a perspective view of a tine assembly and safety bar wherein the tines have elongated mounting stubs.

FIG. 9 is a side view of the tine assembly of FIG. 8 mounted on a bucket having a particular shape.

DETAILED DESCRIPTION OF THE INVENTION

Figure 4:
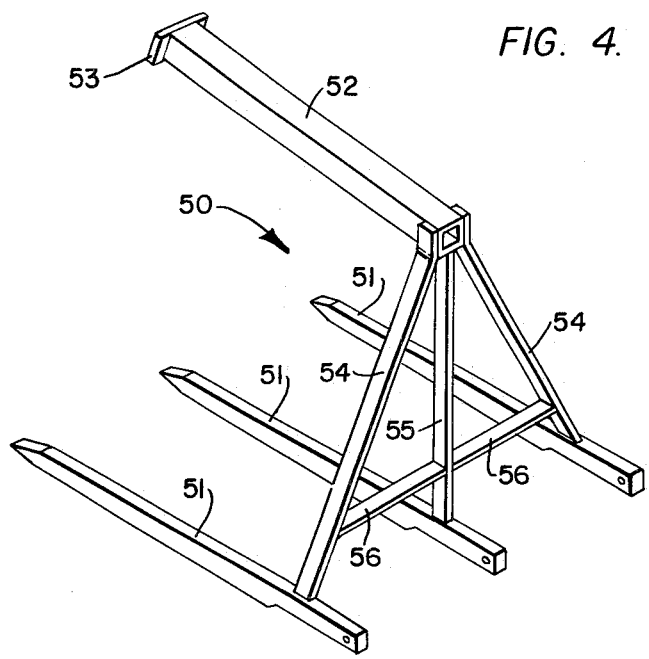
FIG. 4 is a perspective view of a tine assembly with a safety bar.

Beginning with FIG. 1, there is shown a bucket 10 which is attached to the vertically adjustable lift arms 11 of a conventional farm loader. The attitude of the bucket with respect to the lift arms is controlled by a hydraulic cylinder 12. Mounted on the top wall 13 of the bucket, is a hitch mounting bracket 14. As shown, a tine assembly 15 including tines 16 and a safety bar 17 is mounted in the hitch bracket. The bracket includes mounting straps 18 which extend from the rear of the bracket along the top of the bucket and along the portion of the bucket back. The mounting straps are fastened to the bucket by through bolts 20. Telescoping supports 21 are shown, which supports extend from beneath the hitch mounting bracket 14 to the rear wall of the bucket 22. A cylindrical bale 23 is shown in phantom, which bale has been pierced by the tines 16. It will be noted that the safety bar 17 is above the upper extremity of the cylindrical bale. An abutment plate 24 located at the forward-most portion of the safety bar 17 precludes the bale 23 from being pierced by the bar.

Turning now to FIGS. 2 and 3, the hitch mounting bracket 14 and the tine assembly 15 can be seen in greater detail. The mounting bracket 14 comprises a square section channel 25. The channel 25 has a length which is greater than the width between the outermost tines of the tine assembly 15. The square channel 25 includes rectangular sockets 26 formed of tubing, which sockets receive the mounting stubs 27 of the tines. The mounting stubs 27 are formed integrally with the forward bale piercing portion of the tines 16. The tine assembly additionally includes a spacing strut 28 which properly spaces the tines one from another. Attached to the mid-point of the spacing strut 28 is a vertical support 30. Attached to the ends of the spacing strut 28 are diagonal supports 31. The vertical support 30 and the diagonal supports 31 are brought together and are fastened as by welding to the rear portion of the safety bar 17. Triangular gussets 32 may be provided where the supports are attached to the safety bar and the tines, it being understood by those skilled in the art that such gussets add additional strength to the assembly.

Each of the sockets 26 are terminated on their rear surfaces by a plate 33. This plate limits the amount of penetration by the mounting stubs 27 into the socket 26. Conventional spring pins 34 may be used to lock the mounting stubs 27 in the sockets 26 by passing through the apertures provided in the sockets and the mounting stub ends. The mounting straps 18 extend from the rear of the hitch mounting bracket 14 and overlie the top wall 13 of the bucket. The straps 18 may be bent as at 35 to overlie a portion of the rear wall 22 of the bucket. The straps are attached to the bucket by means of through bolts 20. A backing strap 37 located within the bucket and adjacent the top wall thereof receives the through bolts 20 which are closest to the mounting bracket 14. Mounting bolts 38 pass through the square channel 25 and through the top wall 13 of the bucket. The bolts 38 engage front backing plates 40 which are located within the bucket 10. The backing plates 40 include ears 41 which receive one end of the telescoping supports 21. The other end of the supports 21 are received by mounting ears 42 which are attached to rear backing plates 43. The rear backing plates 43 are affixed to the back wall 22 of the bucket by through bolts 44. It will be noted that the telescoping supports 21 comprise two telescoping sections of tubing each having a series of holes drilled along their length. Bolts 45 are provided and pass through mating holes in the telescoping supports, which holes correctly determine the overall length of the adjusted supports. A collar 46 is provided at the end of the smaller of the two supports. This collar has the same outside dimension as that of the larger of the two supports, and standardizes the distance between the mounting ears of the front backing plate 40 and the rear backing plate 43. This feature is desirable where the geometry of the bucket allows only one of the telescoping supports to be used as a diagonal support between the two backing plates 40 and 43.

Turning now to FIG. 4, an alternate tine assembly 50 is shown. This assembly includes three tines 51 over the plane of which is disposed the safety bar 52. The end of the safety bar 52 is provided with an abutment plate 53, said plate precluding the impaling of a bale by the safety bar 52. The assembly 50 includes diagonal supports 54 and a single vertical support 55, one each of the ends of the supports being attached to the rear of the safety bar 52. The diagonal and vertical supports are additionally attached one each to each of the tines 51. A two piece spacing strut 56 provides the assembly 50 with additional rigidity, and properly spaces the tines 51 one from the other.

Figure 5:
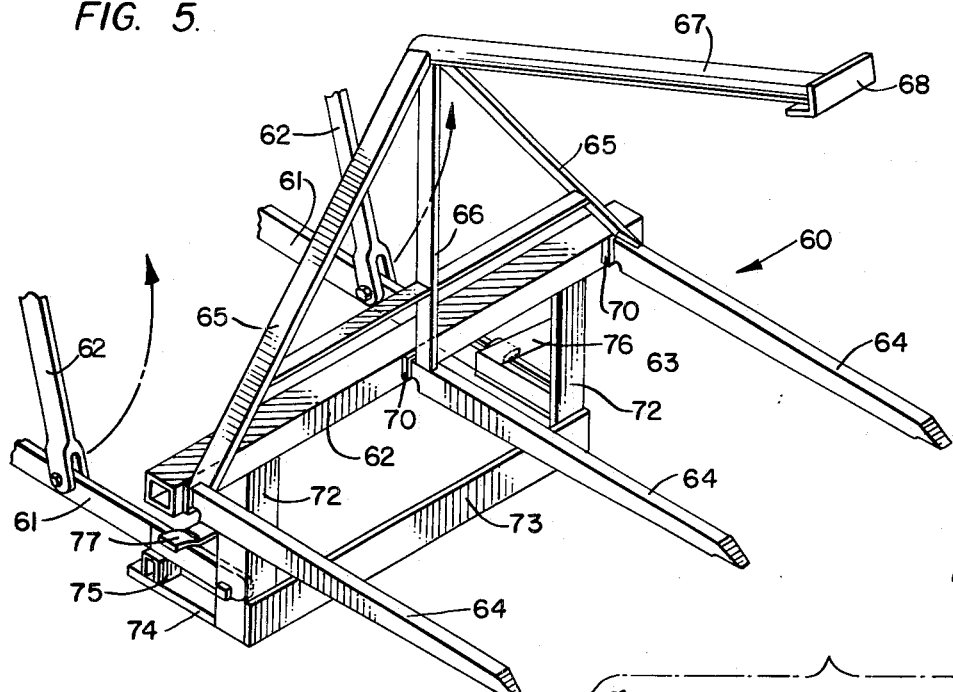
FIG. 5 is a perspective view of a rear mounted bale mover attached to the rear lift arms of a farm tractor.
Figure 7:
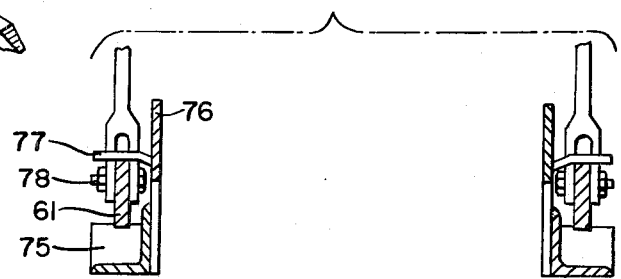
FIG. 7 is a sectional view taken along line 7—7 of FIG. 6.

Turning now to FIGS. 5, 6 and 7, there is shown a bale mover 60 which is attached to the lift arms 61 disposed on the rear of a farm tractor. The lift arms 61 may be adjusted vertically by the atuating links 62 which form a part of the farm tractor. The bale mover 60 includes a hitch 62 which surmounts a generally elongated L-shaped mounting frame 63. The hitch 62 is shown as being generally rectangular in cross-section and has a width which is slightly greater than the width between the outermost of the tines 64. The tines 64 are ganged together by a pair of diagonal supports 65 and a single vertical support 66 which meet and are fastened to a safety bar 67. The end of the safety bar remote from the supports includes an abutment plate 68. The assembly of tines is received by sockets 70 which are provided in the hitch 62. It will be appreciated that the tines are fixed from withdrawal from the socket 70 by spring pins 71 provided for each of the tine ends.

The mounting frame 63 comprises two vertical supports 72 which are spaced from one another by a spacing bar 73. Attached to the lower portion of the vertical support 72 are horizontal arms 74. The horizontal arms include an abutment piece 75. The end of the horizontal arms 74 is fixed in relation to the vertical supports 72 by diagonal members 76. Attached to the diagonal members 76 are abutment tabs 77. It will be seen that the lift arms 61 pass between the abutment tabs 77 and the abutment pieces 75 and are fixed to the vertical supports 72 by a bolt 78. It will be seen that the tine assembly 60 may be easily removed from the hitch 62 by removal of the spring pins 71 which fixed tine ends to the sockets 70. Further, the mounting frame 63 may be easily removed from the lift arms 61 of the tractor by removal of the bolts 78. The bolts 78 together with the abutment tabs 77 and the abutment pieces 75 easily but rigidly locate the mounting frame on the rear end of the lift arms 61.

Turning now to FIG. 8, a tine assembly having two tines 81 and a safety bar 82 is shown. The safety bar is fixed to the tines by the diagonal supports 83 and the single vertical support 84. The tines are spaced one from the other by the spacing strut 85. The strut 85 and the ends of the diagonal supports 83 are fastened to the tines at points 87 and gussets 88 provide additional strength to the assembly. The tines include elongated ends 89.

FIG. 9 shows a bucket 90 having a top wall 91, bottom wall 92, and side walls 93. It will be seen that the top wall 91 is generally parallel to the bottom wall 92, and that the shape of the side walls 93 is such that the side walls of the bucket presents a shallow angle when viewed from the bucket front. The tine assembly of FIG. 9 is shown mounted to a hitch 94 which is fastened to the top wall 91 of the bucket. As will be seen, the elongated mounting stubs 89 of the tine assembly of FIG. 8 space the point 87 on the tines such that a perpendicular to the tines drawn from this point will intersect the front lower edge 95 of the bucket 90. The penetration of the mounting stubs 89 into the hitch 94 is limited by plates 96 which are located at the rear of the implement receiving sockets 97. When a bale 98, shown in phantom, is lifted by the tines, the penetration of the tines into the bale is limited by the supports 83, 84, and 85. This limitation of penetration is chosen so that the bottom of the bale 98 is supported by the lower front edge 95 of the bucket.

Having thus described the invention, various departures and modifications will occur to those skilled in the art, which departures and modifications are intended to be within the scope of this invention as defined by the appended claims.

What is claimed is:

1. An assembly of tines for use with a hitch assembly comprising three tines located in a common plane, mounting means and pointed ends integral with said tines, means attached to said tines between said mounting means and said pointed ends for spacing said tines one from the other and maintaining said tines in a predetermined relationship, a safety bar, with abutment means forming a blunt end thereon, means for maintaining said safety bar in a predetermined relationship to said tines, said abutment means being spaced from said maintaining means, said safety bar being spaced above said tines, between said outermost tines, wherein said safety bar and one of said tines define a plane which is perpendicular to said common plane.

2. An implement receiving hitch for use with a front loader having a vertically adjustable load bucket, said bucket having a top surface, a back surface, and a front rim, said hitch comprising:
- an elongated hollow mounting means mounted on said top surface of said front end loader bucket parallel to the rim of said top surface,
- socket means formed in said mounting means, said socket means having an axis which defines a first direction,
- strap means attached to said mounting means and extending in a direction which is parallel to said first direction,
- first fastening means for attaching said mounting means to said top surface and second fastening means for attaching said strap means to said top surface,
- bracing means inside said load bucket and extending from inside of said top surface to inside of said back surface, and
- third fastening means for attaching said bracing means to the inside of said back surface.

3. The implement receiving hitch of claim 2 further including:
- adjustable length means for adjusting the length of said bracing means.

4. The implement receiving hitch of claim 3 wherein:
- said adjustable length means comprises first and second telescoping means having first and second outside circumferences, said first and second outside circumference being different whereby said first telescoping means is received by said second telescoping means, and fixing means fixes the overall length of the telescoping means.

5. The implement receiving hitch of claim 4 further including:
- backing strap means, said second fastening means attaching said backing strap means to said load bucket,
- plate means on one end of said telescoping means, said first fastening means attaching said plate means to said load bucket, and
- a collar on said first telescoping means, said collar having an outside circumference which is equal to said second outside circumference.

6. An implement receiving hitch for use with a farm vehicle having a pair of rearwardly disposed vertically adjustable lift arms, said hitch comprising:
- elongated mounting means for mounting an implement,
- socket means in said mounting means for receiving said implement,
- a mounting frame comprising two L-shaped members, a first end of each of said L-shaped members being attached to said mounting means, and a second end,
- passage means for receiving said lift arms;
- means for fixing said lift arms to said mounting frame and,
- said passage means including abutment means on said second end of said L-shaped members for engaging said lift arms to support said second ends of said L-shaped members.

7. The implement receiving hitch of claim 6 wherein said passage means is generally parallel to one side of said L-shaped member, and said lift arms, when fixed to said mounting frame, are generally parallel to the direction of passage of said socket means through said mounting means.

* * * * *